Patented Feb. 23, 1954

2,670,321

UNITED STATES PATENT OFFICE 2,670,321

CONVERSION OF HYDROCARBONS WITH AN ACTIVE SILICA COMPOSITED CATALYST MIXTURE

Jacque C. Morrell, Merion, Pa.

No Drawing. Application March 3, 1949, Serial No. 79,527

11 Claims. (Cl. 196—50)

This invention relates to the treatment of hydrocarbons and more particularly relates to the treatment of heavier hydrocarbons to produce lighter hydrocarbons of lower boiling range suitable for motor fuels. It relates further to a catalytic process or method for improving the octane rating or anti-knock value of hydrocarbons within the motor fuel boiling range including straight run, thermally and catalytically cracked gasoline. This latter process is commonly referred to as reforming.

More particularly my invention relates to catalytic cracking or more broadly conversion of heavier hydrocarbons especially petroleum distillates to produce high octane motor fuels as well as to the use of special catalysts to accomplish these purposes.

In one of its specific aspects my invention relates to the use of special compound cracking or hydrocarbon conversion and reforming catalysts which comprise a major proportion of a base consisting essentially of active silica-titania and silica-alumina-titania mixtures such as silica gels or hydrogels or hydrated silica together with an active or activated titania or titanium oxide preferably in the form of a hydrogel alone and in some cases additionally an alumina or hydrated aluminum oxide, i. e. in the form of a hydrogel. These catalysts produce scission and splitting of the carbon to carbon bond as well as isomerization and some aromatization due to the titanium oxide. When these catalysts are admixed with or contain a catalytic material or component selected from the group comprising oxides of the 5th and 6th groups of the periodic system respectively vanadium oxide ($V_2O_5$), and chromium and molybdenum oxides ($Cr_2O_3$) and $MoO_3$ or mixtures thereof aromatization is increased. These oxides, preferably of the activated gel or hydrogel types, are stabilized by the silica-titania or silica-alumina-titania supports or carriers and are very active dehydrogenation and cyclization catalysts. Titanium oxide appears to have the property of breaking the C—C bond and therefore is a cracking catalyst when mixed directly with active silica alone or in admixture with alumina, as well as being an aromatization catalyst, and it is an important part of my invention to employ it alone in combination with active silica gels or hydrogels as a cracking catalyst as well as a reforming catalyst. Likewise, I may employ mixtures of active silica or active silica and alumina with titanium oxides, as well as together with the oxides of the 5th and 6th groups, i. e. vanadium, chromium and molybdenum for hydrocarbon conversion and reforming.

I may likewise employ nonequivalently to the above or to each other mixtures of active or activated titanium oxides or hydrogels or gels, together with a base consisting of an active silicate of aluminum, or hydrosilicate or alumino silicic acid or activated or active natural clays such as montomorillonite, bentonite, fuller's earth and the like, as well as kaolin and in some cases the hydrosilicates or hydrated silicates of magnesium (such as talc) or nonequivalently active magnesium silicate gels or hydrogels and also some zeolites.

The catalysts may be prepared in a variety of ways and may cover a wide range of compositions in various admixtures following the above principles. Generally the titanium oxide in active form alone or together with active oxides, e. g. of chromium, molybdenum, vanadium, etc. may be deposited upon the carriers or supports from aqueous or other solutions or they may be precipitated upon or admixed mechanically with the carriers either in the wet or dry condition. Also some commercial forms of titanium oxide may be employed. None of these catalysts are equivalent either as to composition or method or preparation. My catalysts specifically include a sufficient amount of the components such as silica and titania or silica, titania and alumina to cause scission or cracking as well as isomerization and some aromatization or cyclization and at the same time may contain additional dehydrogenation and cyclization catalytic components, such as those mentioned above.

I am aware that mixtures of silica and alumina have been employed as cracking catalysts, and that mixtures of alumina and oxides of chromium, etc., have been used to dehydrogenate and to cyclize various hydrocarbons, and take advantage of certain properties of these various catalysts in connection with my invention. However, I believe I am the first to employ mixtures of silica and titania and the other mixtures disclosed which will be shown clearly in the following explanation of my invention to achieve results of a very desirable and unique character which the use of some of these catalyst components separately or as disclosed in the prior art could achieve either as regards yields or quality of products aside from their novelty. This is in part due to the cooperative as well as the selective action of the various components of my catalysts upon the hydrocarbons, and their intermediate products undergoing treatment to produce certain desirable low boiling components of motor fuel having much higher octane value than would otherwise be the case as well as preventing the formation of certain undesirable components which otherwise would be formed.

While cracking is generally considered as the breaking down of higher into lower boiling hydrocarbons, this action is accompanied by complete decomposition to some extent into carbon and hydrogen on the one hand and by polymerization of the lower into higher boiling hydrocarbons on the other with perhaps some isomerization and dehydrogenation.

When cracking catalysts of the silica-alumina type are employed these same reactions may occur but to a greatly modified extent particularly showing less decomposition to carbon and hydrogen and more isomerization as well as more selective splitting and less gas formation, than thermal cracking, all of which is in the desirable direction. My silica-titania or silica-alumina-titania catalysts produce these results as well as making more desirable aromatic compounds.

This type of catalyst also produces a selective tendency towards polymerization and in general the products of catalytic cracking are quite different from those of pyrolytic cracking. However, different hydrocarbons as well as different members of the same series of hydrocarbons act differently under the influence of various catalysts, for example with cracking catalysts normal octenes show extensive isomerization to iso-octenes as well as cracking to isobutene and isobutane whereas normal octane requires higher temperatures for conversion and produces more straight chain paraffinic hydrocarbons such as pentanes, hexanes, heptanes, etc. In both cases less methane, ethane, ethylene, etc. are produced than by pyrolytic cracking, however the octanes produce more than the octenes.

Cetene with sixteen carbon atoms first isomerizes and then cracks with subsequent isomerization of the lower boiling hydrocarbons whereas cetane with corresponding paraffinic hydrocarbon cracks down largely to gases such as propane and butanes and corresponding paraffins such as pentanes, and the gasoline boiling range products contain a large amount of paraffinic or straight chain hydrocarbons all of which is undesirable in contrast to the products from cetene which showed less gases and the liquids were largely branched chain. My invention eliminates these undesirable reactions and products by a proper direction and selectivity of reactions and products.

In one aspect of my process the presence of a positive dehydrogenation and cyclicizing component in the conversion catalyst, i. e. the oxides of chromium, molybdenum or vanadium as well as that of the titanium itself or mixtures of the same causes a selective dehydrogenation of the paraffinic hydrocarbons instead of scission or decomposition which would result if only the silica and alumina were present. The presence of titanium oxide with the silica and alumina or even with the silica alone corrects these deficiencies and on the other hand these latter components stabilize the activity of the other metal oxides and prevent them from crystallizing and becoming inactive. Furthermore, the silica-titania or silica-alumina-titania components are necessary in the mixture for scission of the C—C bond, at the proper time, and for isomerization.

This primary reaction of dehydrogenation which is in part due to the titanium oxide and perhaps to a greater extent to the other oxides, may then be followed by isomerization and/or by scission by the cracking component, i. e. the silica-titania or silica-alumina-titania and the hexanes, heptanes, octanes, etc. and corresponding olefins may be further dehydrogenated and/or cyclicized or in general undergo aromatization which together with the branched chain compounds resulting from isomerization form a high octane or highly anti-knock mixture of hydrocarbons most desirable for motor and aviation fuel.

It is also well established that intermediate compound hydrocarbons just formed or hydrocarbon radicals in a more or less nascent state are in a most active or reactive form, and my invention takes advantage of the simultaneous presence of these highly active groups and of the necessary catalytic components to direct the reactions towards the formation of the most desirable anti-knock compounds which otherwise would not be formed by the separately active catalyst components either in space or time.

While the above series of reactions are not the only ones which occur they do show the general trend and explain the high percentage of both aromatic hydrocarbons and isomeric or branched chain aliphatic hydrocarbons in the product which is unique for my process.

Also, it can be understood from the above that when converting heavier hydrocarbon distillates or naphthas which may be within the boiling range of motor fuel to the more desirable liquid hydrocarbons the above mechanism is one explanation of the superior results obtained by me with regard to yields and quality of product. The same general reactions may occur in reforming, i. e. conversion of liquid hydrocarbons within motor fuel boiling range although the sequence may not be the same, i. e. dehydrogenation of paraffins and dehydrocyclization (dehydrogenation followed by ring or aromatic hydrocarbon compound formation) of the olefins with simultaneous isomerization particularly of the latter hydrocarbons. Also, when scission occurs of liquids within the gasoline boiling range dehydrogenation and polymerization of the resulting products may occur followed by the formation of isomeric or branched chain and aromatic hydrocarbons which are the desirable hydrocarbons for high octane motor and aviation fuels.

With regard to the catalysts I may employ the mixtures of active silica and of active titanium oxide (alone or with some active alumina) e. g. of the synthetic gel or hydrogel type; the ratio of silica to titania (or mixtures of the latter with some alumina) may vary from 10 to 90 parts respectively to from 90 to 10 parts but generally I prefer to employ more than 50% of silica and more preferably 90 to 95% of active silica and 5 to 10% of titania (alone or in admixture with some alumina) in the silica-titania mixture. This may be employed directly but when more aromatization is desired the final catalyst may contain 90% to 99% of the silica-titania or silica-alumina-titania mixture and 1 to 10% more or less of the metal oxides (e. g. 5%) namely those of chromium, molybdenum and vanadium. These catalysts may be employed as pellets, pills, granules or powder depending on the process and/or equipment employed in their use.

Alternatively but not equivalently I may employ mixtures of two types of catalysts, i. e. silica-titania or silica-alumina-titania and the other oxides deposited, e. g. titania or on alumina separately, i. e. in the form of separate granules, pills, powder, etc., to be employed simultaneously, but it is evident that these mixtures are not equivalent to, or as efficient as the catalysts where the particles are substantially homogeneous and each like the other.

I may also add nonequivalently to the mixture of silica-titania or silica-alumina-titania and the other dehydrogenating oxides, e. g. chromium tri-oxide, etc., from several percent up to 50 percent of a natural hydrosilicate of aluminum, or hydrated aluminum silicate preferably activated, e. g. of the active or activated clay type, or hydrated magnesium silicate.

In the preparation of the catalysts the best conventional methods may be employed, e. g. the metal oxides may be precipitated from solutions, e. g. in the case of chromium, chromic acid or a salt on a base material, e. g. either titania or alumina or silica-titania and silica-alumina-titania mixtures and the latter dried and/or reduced in a hydrogen atmosphere. The silica-titania or silica-alumina-titania mixtures may be prepared by co-precipitation or separately. Also the activated titania and alumina of commerce may be employed. Generally, the gel or hydrogel form of the various catalyst components are preferred and in any event should be of the active type. It may be noted when the active oxides of chromium, vanadium and/or molybdenum are deposited on titania or titanium oxide, I obtain a dehydrogenating and/or cyclization catalyst for the treatment of hydrocarbons which is novel.

The catalysts may be employed in conventional catalytic cracking, reforming and/or hydroforming equipment, e. g. of the conventional stationary bed or moving bed or fluid flow or gas lift types.

The feed, which may consist of light gas oil, kerosene or naphtha where conversion to motor fuel is the objective or of straight run, thermally cracked or catalytically cracked gasoline or light naphthas where reforming to improve octane number is the objective, may be preheated and vaporized and then passed through a catalyst containing chamber (or series of chambers) together if desired with preheated gas containing hydrogen which may be made in the process. The products are then cooled and fractionated, and the liquid separated from the gases, the former being stabilized, and the latter scrubbed. The reflux from the fractionator may be recycled to produce further yields of gasoline and part of the gas from the separator may also be recycled. After a period of time the catalyst becomes fouled with carbon or coke and tars and one (or more) alternate chambers are provided to maintain continuous operation while the carbon and tars are burned off with air and/or steam. During this operation the temperature is kept below 1000° F. to 1100° F. or as low as possible.

Heat exchangers, recirculating pumps for fluids or molten solids, e. g. salts or low melt point metals, and other devices may be employed for heat control, recovery and economy.

The catalyst chambers and the system generally may be maintained at low superatmospheric pressures, e. g. of the order of 10 to 50 lbs. and upwards to 250 lbs. or more per square inch up to high pressures as desired. The conversion temperatures may vary from 750° F. to 1050° F. or higher and generally between 800° F. to 1000° F. The space velocities may be from less than 1, to 10 volumes of liquid oil per volume of the catalyst per hour more or less.

Instead of the fixed bed operation one may employ the fluid flow process. In this the oil charge is vaporized and the finely divided catalyst introduced as a powder into the line carrying the vapor and thence through a perforated plate or grid at the bottom of the reaction chamber. The catalyst and vapors pass concurrently upward through the reaction chamber where the conversion takes place, and from the top of which the vapors and catalyst pass through cyclone separators where the spent catalyst is separated from the vapors and the latter fractionated into gasoline, heavier fractions, which may be recycled, gas, etc. The spent catalyst is reactivated by burning and is recycled into the system. The flow of catalyst through the conversion and reactivating system is continuous and the vapor-catalyst and catalyst-air mixtures, etc., are handled as fluids.

Similarly the catalysts may be handled mechanically or by gas lift methods. All of these methods of operation are now conventional.

With regard to yields and improvements in octane values obtainable by my process, the following will serve as examples.

In connection with the examples it should be borne in mind that the process may be employed for the conversion of heavier oils to motor fuels and is especially adapted to improving the octane values of various motor fuels especially straight run naphthas and gasolines as well as thermal and catalytically cracked naphthas and gasolines or selected fractions thereof.

As an example of the results obtainable by my process when employing a catalyst of the silica-titania type starting with a naphtha of 230° F. to 450° F. boiling range with an octane number (A. S. T. M.) of 52 and employing a temperature in the range of 850° F. to 950° F. and pressures of 10 to 50 lbs. per square inch one may obtain a product with an initial boiling point of 98° F. and a maximum of 375° F. with A. S. T. M. octane number of 82 and a recovery of 80%. With somewhat heavier charging stocks, yields of 70 to 75% with comparable octane numbers may be obtained and similar overall results with perhaps longer catalyst life may be obtained with silica-alumina-titania mixtures. In another case employing silica-titania-chromia (as such or with some alumina), and starting with a straight run gasoline of 100° F. to 400° F. boiling range the increase in octane number may be from 48 for the charge to 83 for the product with a loss of 15%. By taking a 20% loss the octane value may be increased to 87. In some cases octane values well exceeding 90 may be obtained by the treatment of straight run gasolines.

Similar results may be obtained with the other types of catalysts, i. e. with the silica-titania-molybdena (as such or with some alumina) type or those containing vanadium oxide, etc., or where activated clays, etc. are used as a base material. Also the blending values of the products are higher than indicated for the products as such.

In general the octane values of straight run gasolines and naphthas may show increases of 35 to 45 points in octane values when treated by my process with losses generally under 20% although treatment of thermally cracked and catalytically cracked gasolines also show substantial increases in octane numbers to final values in some cases of over 90, with corresponding relatively low losses.

I may also apply as part of my invention the above processes and the catalysts mentioned herein to the treatment of gaseous hydrocarbons especially of a paraffinic character, e. g. propane and butanes, particularly the latter which may be dehydrogenated and thereafter polymerized and/or isomerized.

It is, of course, to be understood owing to the large number of combinations and variations of my catalysts and processes that the examples are illustrative only and should therefore not be limiting on the broad scope and spirit of my invention.

I claim as my invention:

1. A process for the conversion of higher boiling to lower boiling hydrocarbons of high octane value and suitable for motor fuel which comprises subjecting the said hydrocarbons to conversion conditions of temperature and space velocities in the presence of a composited catalyst comprising an intimate and integrated mixture of active silica and active titanium oxide and a dehydrogenating component of an oxide in the physical state of a gel selected from the group consisting of the active oxides of chromium, molybdenum and vanadium, the said oxides consisting of more than 1% and less than 10% of the mixture.

2. A process for the conversion of higher boiling to lower boiling hydrocarbons of high octane value and suitable for motor fuel which comprises subjecting the said hydrocarbons to conversion conditions of temperature in the range of about 800° F. to 1000° F. in the presence of a composited catalyst comprising an intimate and integrated mixture of active silica and active titanium oxide and a dehydrogenating component of an oxide in the physical state of a gel selected from the group consisting of the active oxides of chromium, molybdenum and vanadium, the said oxides consisting of more than 1% and less than 10% of the mixture.

3. A process for the conversion of higher boiling to lower boiling hydrocarbons of high octane value and suitable for motor fuel which comprises subjecting the said hydrocarbons to conversion conditions of temperature in the range of about 800° F. to 1000° F. and space velocities of the order of less than ten volumes of liquid oil per volume of catalyst per hour in the presence of a composited catalyst comprising an intimate and integrated mixture of active silica and titanium oxide, and a dehydrogenating component of an oxide in the physical state of a gel selected from the group consisting of the active oxides of chromium, molybdenum and vanadium, the said oxides consisting of more than 1% and less than 10% of the mixture.

4. A process for the conversion of higher boiling to lower boiling hydrocarbons of high octane value and suitable for motor fuel which comprises subjecting the said hydrocarbons to conversion conditions of temperature in the range of about 800° F. to 1000° F. in the presence of a composited catalyst comprising an intimate and integrated mixture of active silica, active alumina and active titanium oxide and a dehydrogenating component of an oxide in the physical state of a gel selected from the group consisting of the active oxides of chromium, molybdenum and vanadium, the said oxides consisting of more than 1% and less than 10% of the mixture.

5. A process for reforming hydrocarbons in the motor fuel boiling range to improve the octane value thereof which comprises subjecting the said hydrocarbons to conversion conditions of temperature and space velocities in the presence of a composited catalyst which comprises of an intimate and integrated mixture of active silica and titanium oxide, and a dehydrogenating component of an oxide in the physical state of a gel selected from the group consisting of the active oxides of chromium, molybdenum and vanadium, the said oxides consisting of more than 1% and less than 10% of the mixture.

6. A process for reforming hydrocarbons in the motor fuel boiling range to improve the octane value thereof which comprises subjecting the said hydrocarbons to conversion conditions of temperature and space velocities in the presence of a composited catalyst which comprises of an intimate and integrated mixture of active silica, alumina and titanium oxide, and a dehydrogenating component of an oxide in the physical state of a gel selected from the group consisting of the active oxides of chromium, molybdenum and vanadium, the said oxides consisting of more than 1% and less than 10% of the mixture.

7. A process for reforming hydrocarbons in the motor fuel boiling range to improve the octane value thereof which comprises subjecting the said hydrocarbons to conversion conditions of temperature in the range of about 800° F. to 1000° F. and space velocities in the presence of a composited catalyst which comprises an intimate and integrated mixture of active silica and titanium oxide, and a dehydrogenating component of an oxide in the physical state of a gel selected from the group consisting of the active oxides of chromium, molybdenum, vanadium and titanium, the said oxides consisting of more than 1% and less than 10% of the mixture.

8. A process for reforming hydrocarbons in the motor fuel boiling range to improve the octane value thereof which comprises subjecting the said hydrocarbons to conversion conditions of temperature in the range of about 800° F. to 1000° F. and space velocities of the order of less than ten volumes of liquid oil per volume of catalyst per hour in the presence of a composited catalyst comprising an intimate and integrated mixture of active silica and titanium oxide, and a dehydrogenating component of an oxide in the physical state of a gel selected from the group consisting of the active oxides of chromium, molybdenum and vanadium, the said oxides consisting of more than 1% and less than 10% of the mixture.

9. A process for the conversion of higher boiling to lower boiling hydrocarbons of high octane value and suitable for motor fuel which comprises subjecting the said hydrocarbons to conversion conditions of temperature and space velocities in the presence of a composited catalyst which comprises an intimate and integrated mixture of hydrogels of silica and titanium oxide, and a dehydrogenating component of an oxide in the physical state of a gel selected from the group consisting of the active oxides of chromium, molybdenum and vanadium, the said oxides consisting of more than 1% and less than 10% of the mixture.

10. A process for reforming hydrocarbons in the motor fuel boiling range to improve the octane value thereof which comprises subjecting the said hydrocarbons to conversion conditions of temperature and space velocities in the presence of a composited catalyst comprising of an intimate and integrated mixture of active silica and titanium oxide, and a dehydrogenating component of an oxide in the physical state of a gel selected from the group consisting of the active oxides of chromium, molybdenum and vanadium, the said oxides consisting of more than 1% and less than 10% of the mixture.

11. A process for reforming hydrocarbons in the motor fuel boiling range to improve the octane value thereof which comprises subjecting the said hydrocarbons to conversion conditions of temperature and space velocities in the presence of a composited catalyst comprising an intimate and integrated mixture of active silica and titanium oxide gels, and a dehydrogenating component of an oxide in the physical state of a gel selected from the group consisting of the active oxides of chromium, molybdenum and vanadium in an amount of from one to ten percent.

JACQUE C. MORRELL.

References Cited in the file of this patent

UNITED STATES PATENTS

| Number | Name | Date |
|---|---|---|
| 2,157,965 | Pongratz | May 9, 1939 |
| 2,258,787 | Melaven | Oct. 14, 1941 |
| 2,344,911 | Young | Mar. 21, 1944 |
| 2,372,165 | Arveson | Mar. 20, 1945 |
| 2,385,552 | Spence et al. | Sept. 25, 1945 |
| 2,395,836 | Bates | Mar. 5, 1946 |
| 2,500,197 | Michael et al. | Mar. 14, 1950 |